UNITED STATES PATENT OFFICE.

WILHELM PALMAER, OF STOCKHOLM, SWEDEN.

PROCESS OF MANUFACTURING MANURE FROM RAW PHOSPHATES.

995,894.  Specification of Letters Patent.  Patented June 20, 1911.

No Drawing.   Application filed February 5, 1907.  Serial No. 355,943.

*To all whom it may concern:*

Be it known that I, WILHELM PALMAER, a subject of the King of Sweden, and resident of Stockholm, Sweden, have invented a new and useful Improved Process of Manufacturing Manure from Raw Phosphates, of which the following is a specification.

The Patents No. 707886 and No. 748523 describe a process of manufacturing tricalcic phosphate and bicalcic phosphate by electrolyzing a solution of a salt of such a composition that an acid forming with lime a soluble salt is disengaged at the anode while a basic hydrate is formed at the cathode, such salts being for instance alkaline or ammoniac salts containing nitric acid, chloric acid, perchloric acid, etc., or a solution of a mixture of such salts, among which small quantities of foreign salts, for instance chlorids, may be present. The manufacture of bicalcic phosphate is effected in such a manner that the mineral-phosphate is placed in a separate vessel where it is acted upon by the acid solution formed at the anode and dissolved, a suitable quantity of the solution formed at the cathode being afterward added to the acid solution of phosphate obtained to precipitate bicalcic phosphate, while in manufacturing tricalcic phosphate the acid solution of the mineral phosphate is mixed at once with the whole quantity of alkaline solution obtained by the electrolysis simultaneously with the acid solution, which has been taken out for dissolving the mineral-phosphate.

An essential novelty in the method described in the above mentioned patents was that acid and alkali for treating even poor, up to this time worthless, raw phosphate can be manufactured in an economically advantageous way.

I have found that the method described in the Patent No. 748523 of manufacturing bicalcic phosphate, provided alkaline salts are used as electrolyte and consequently bicalcic phosphate precipitated by means of an easily soluble alkaline hydrate, has an essential advantage over the method known before for precipitating bicalcic phosphate from an acid solution of a raw phosphate by means of lime. If, to an acid solution of a raw phosphate a solution of for instance hydrate of potassium or of sodium is added in a quantity just sufficient to render the solution slightly acid, or plainly neutral, it is possible, by introducing the said alkaline solution in a finely divided form and under agitation, to obtain almost all of the phosphoric acid precipitated in the form of nearly pure bicalcic phosphate containing citrate-soluble phosphoric acid without admixture of tricalcic phosphate, in which latter the phosphoric acid is not citrate-soluble; the quantity of citrate-soluble phosphoric acid in the precipitate amounts to from 95 to 99% of the total percentage of phosphoric acid in the original solution of raw phosphate. This is of a great economical importance as only bicalcic phosphate but not tricalcic phosphate exerts a manurial effect on all kinds of soil and consequently the worth of the product is generally determined by its percentage of citrate-soluble phosphoric acid, which as mentioned above corresponds to its percentage of bicalcic phosphate. If on the other hand lime-wash is used as a precipitating means, as is done in several glue-mills, where bones are dissolved by hydrochloric acid, or if a mixture of hydrate of magnesia and water is used, as has also been proposed, there can not be prevented the complete saturation of the acid solution which occurs in some places in the vicinity of the small particles of hydrate of lime or magnesium, whereby tricalcic phosphate is precipitated. The bicalcic phosphate manufactured in glue-mills which is precipitated by lime-wash does not contain over 65% of the total quantity of phosphoric acid in a citrate-soluble form and by hydrate of magnesia a still more unfavorable result is obtained. Besides experience has shown that a so-called retrogradation takes place, *i. e.* the percentage of citrate-soluble phosphoric acid diminishes in the course of time, when bicalcic phosphate precipitated by means of lime (and probably also if precipitated by means of magnesia) is kept in store. This depends on the fact that solid particles of lime in the mixture, which hardly can be avoided, react on the bicalcic phosphate, and tricalcic phosphate is formed. In bicalcic phosphate precipitated with potash or soda in solution on the contrary, no retrogradation can take place as experience has also proved. This fact that precipitating by means of easily soluble alkaline hydrates a product which is almost entirely citrate soluble is obtained can be utilized also in such a manner that the acid and alkali required for dissolving the raw phosphate and precipitating the bicalcic phosphate are produced by electrolyzing chlorid of sodium or chlorid of potassium in a known manner so as to obtain a solution of hydrate of alkali, it may be after dissolving an alloy of alkali metals by water, and chlorin gas. The chlorin gas may be transformed in a known manner into hydrochloric acid for instance by causing it to combine with hydrogen disengaged at the cathode during the electrolysis, the reaction being started by a suitable catalytic substance for instance charcoal or finely divided platinum, or by leading the chlorin, mixed with steam, over incandescent coke, after which the hydrochloric acid is absorbed by water, and an aqueous solution is obtained. By the hydrochloric acid thus obtained the raw phosphate is dissolved and then bicalcic phosphate is obtained by precipitating with a portion of the hydrate of alkali simultaneously obtained. Afterward, after gathering the bicalcic phosphate, the remaining part of the hydrate of alkali simultaneously obtained is added, the lime remaining in the solution amounting to about ⅓ of the original quantity in the raw phosphate dissolved being mainly precipitated as a hydrate and the last traces of lime are precipitated by introducing some carbon dioxid, after which the electrolyte is regenerated in the same manner as indicated in the Patent No. 748523.

Chlorid of sodium and of potassium respectively being essentially cheaper than the salts, such as nitrates, chlorates and perchlorates of alkali metals, mentioned as electrolytes in the Patents No. 707886 and No. 748523, it may, depending on local circumstances, in some cases become more advantageous to work according to the method now described.

If it is desired to manufacture tricalcic phosphate by the method now described, it is effected by adding at once to the acid solution of the raw phosphate the whole quantity of alkali obtained by electrolysis under production of the acid used in dissolving the raw phosphate, tricalcic phosphate being precipitated and gathered, after which the electrolyte is regenerated What I do claim as my invention and desire to secure by Letters Patent, is:—

A process of manufacturing a chemical manure from raw phosphates consisting in subjecting mineral phosphate to the action of hydrochloric acid and adding a solution of the hydroxid of an alkali metal to the acid solution of the phosphate for precipitating the latter as bicalcic phosphate.

In testimony whereof I have signed my name to this specification, in the presence of two subscribing witnesses.

WILHELM PALMAER.

Witnesses:
 CARL FRIBERG,
 HJALMAR JETTERSTRÖM.